(12) United States Patent
Li et al.

(10) Patent No.: US 10,819,605 B2
(45) Date of Patent: Oct. 27, 2020

(54) METHOD, APPARATUS, AND SYSTEM FOR IMPLEMENTING DELAY MEASUREMENT

(71) Applicant: HUAWEI TECHNOLOGIES CO., LTD., Shenzhen, Guangdong (CN)

(72) Inventors: Guoping Li, Beijing (CN); Danian Shi, Nanjing (CN); Xiaoyang Xu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 652 days.

(21) Appl. No.: 15/391,259

(22) Filed: Dec. 27, 2016

(65) Prior Publication Data
US 2017/0195205 A1    Jul. 6, 2017

(30) Foreign Application Priority Data
Dec. 30, 2015    (CN) .......................... 2015 1 1026380

(51) Int. Cl.
*H04L 1/24*    (2006.01)
*H04L 12/26*    (2006.01)
*H04L 12/42*    (2006.01)

(52) U.S. Cl.
CPC .......... *H04L 43/0852* (2013.01); *H04L 12/42* (2013.01); *H04L 43/0858* (2013.01);
(Continued)

(58) Field of Classification Search
None
See application file for complete search history.

(56) References Cited

U.S. PATENT DOCUMENTS 6,466,548 B1 * 10/2002 Fitzgerald ............... H04L 43/50
                                                    370/249
7,443,801 B2 * 10/2008 Neidhardt ........... H04L 43/0864
                                                    370/238
(Continued)

FOREIGN PATENT DOCUMENTS

CN    1777126 A    5/2006
CN    1889470 A    1/2007
(Continued)

OTHER PUBLICATIONS

XP15077441A, D. Frost et al.,"Packet Loss and Delay Measurement for MPLS Networks draft-ietf-mpls-loss-delay-04" Jan. 20, 2012,total 52 pages.
(Continued)

*Primary Examiner* — Willie J Daniel, Jr.
(74) *Attorney, Agent, or Firm* — Kilpatrick Townsend & Stockton LLP

(57) ABSTRACT

A method and an apparatus for implementing delay measurement. The method includes: determining, by a measurement apparatus, a delay T0 generated when a first packet is transmitted at a first priority over a first loopback path that includes a first sub-path and a second sub-path; determining a delay T1 generated when a second packet is transmitted over a second loopback path that includes the first sub-path, the second sub-path, a third sub-path, and a fourth sub-path, where the second packet is transmitted at the first priority over the first sub-path and the second sub-path and is transmitted at a second priority over the third sub-path and the fourth sub-path; and determining a delay according to T0 and T1. Therefore a delay can be measured only by implementing a measurement function in the measurement apparatus, thereby resolving a problem of complex implementation.

20 Claims, 10 Drawing Sheets

(52) U.S. Cl.
CPC .......... *H04L 43/0864* (2013.01); *H04L 43/12* (2013.01); *H04L 43/50* (2013.01)

(56) References Cited

U.S. PATENT DOCUMENTS

| | | | |
|---|---|---|---|
| 7,468,948 B2* | 12/2008 | Rogers | H04L 12/5601 370/241 |
| 9,369,362 B2* | 6/2016 | Stein | H04L 43/0811 |
| 2005/0058083 A1 | 3/2005 | Rogers | |
| 2006/0092850 A1 | 5/2006 | Neidhardt et al. | |
| 2007/0097865 A1 | 5/2007 | Song et al. | |
| 2012/0163191 A1 | 6/2012 | Tokimizu et al. | |
| 2013/0088994 A1 | 4/2013 | Guo et al. | |
| 2015/0023179 A1 | 1/2015 | Stein et al. | |

FOREIGN PATENT DOCUMENTS

| | | |
|---|---|---|
| CN | 101267363 A | 9/2008 |
| CN | 102413017 A | 4/2012 |
| CN | 105119775 A | 12/2015 |
| JP | 2003143144 A | 5/2003 |
| JP | 2008518552 A | 5/2008 |
| JP | 2008519493 A | 6/2008 |
| JP | 5538652 B2 | 7/2014 |
| JP | 2014192584 A | 10/2014 |

OTHER PUBLICATIONS

OpenFlow Switch Specification Version 1.5.1 ( Protocol Version 0x06 ), Mar. 26, 2015, total 283 pages.

\* cited by examiner

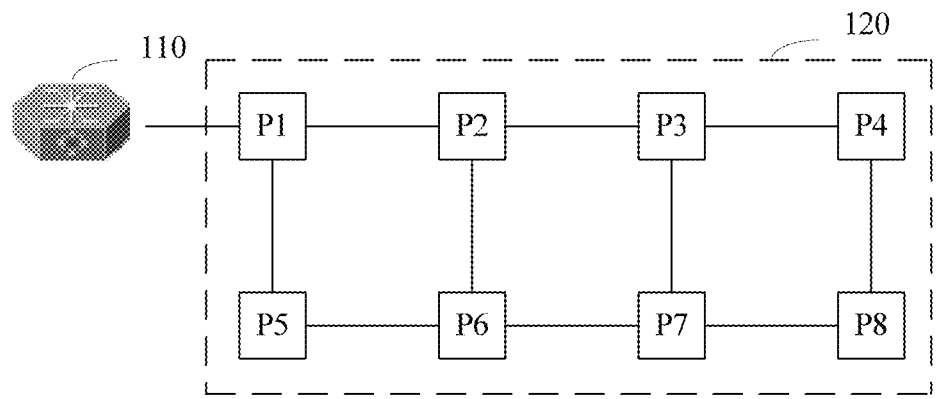

FIG. 1

```
┌─────────────────────────────────────────────────────────────┐      S10
│ A measurement apparatus 110 determines a delay T0 generated when a │ ──
│   first packet is transmitted at a first priority over a first loopback path │
└─────────────────────────────────────────────────────────────┘
                                │
┌─────────────────────────────────────────────────────────────┐      S20
│ The measurement apparatus 110 determines a delay T1 generated when a │ ──
│       second packet is transmitted over a second loopback path       │
└─────────────────────────────────────────────────────────────┘
                                │
┌─────────────────────────────────────────────────────────────┐      S30
│    The measurement apparatus 110 determines a delay between a first  │ ──
│  network element and a second network element according to T0 and T1 │
└─────────────────────────────────────────────────────────────┘
```

FIG. 2a

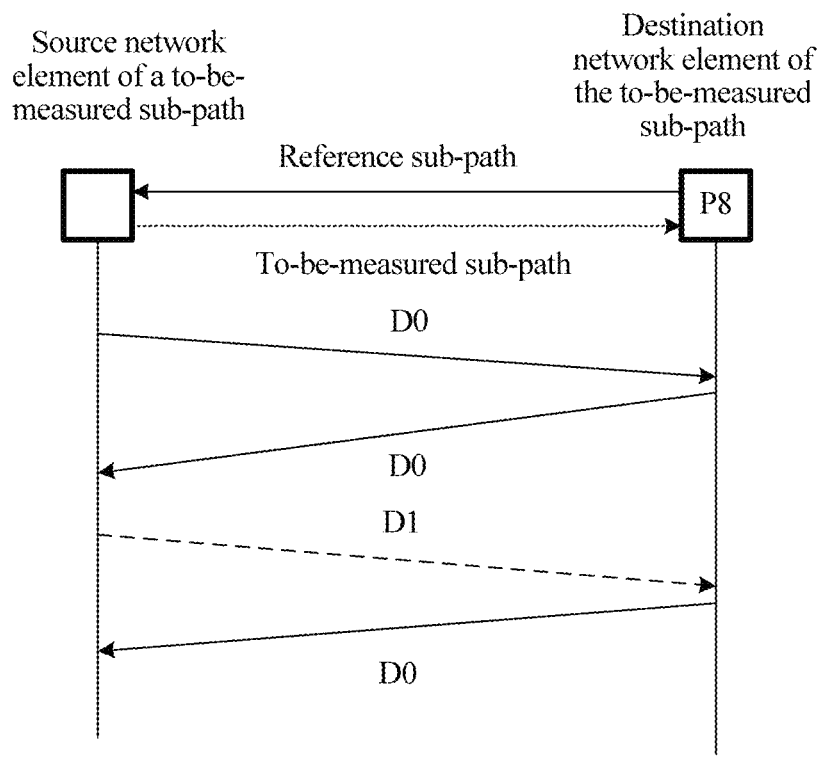

FIG. 4

A measurement apparatus 110 sends a first packet, where the first packet includes routing information of a first loopback path, the routing information in the first packet is used to instruct a network element on the first loopback path to route the first packet along the first loopback path, the first packet further includes priority information, and the priority information in the first packet is used to instruct the network element on the first loopback path to transmit the first packet at a first priority over the first loopback path — S10-1

The measurement apparatus 110 receives the first packet returned over the first loopback path — S10-2

The measurement apparatus 110 determines T0 as a difference between a time of receiving the first packet and a time of sending the first packet — S10-3

FIG. 5a

METHOD, APPARATUS, AND SYSTEM FOR IMPLEMENTING DELAY MEASUREMENT

CROSS-REFERENCE TO RELATED APPLICATION

This application claims priority to Chinese Patent Application No. 201511026380.7, filed on Dec. 30, 2015, which is hereby incorporated by reference in its entirety.

TECHNICAL FIELD

The present invention relates to the field of communications technologies, and in particular, to a method, an apparatus, and a system for implementing delay measurement.

BACKGROUND

In a communications network, a delay is a very important parameter that reflects quality of the communications network. Especially in a data center network with a high throughout, a long delay greatly affects a service. Precise delay measurement is highly significant for real-time network quality monitoring and problem locating.

The delay mainly includes three parts: a serialization delay, a transmission delay, and a switching delay.

Serialization delay: When being transmitted, a packet needs to be serialized on a transmission line, and a period of time for serializing the first bit to the last bit of the packet is the serialization delay. Serialization delay=Packet size/Network bandwidth. For example, when a packet of 64 bytes is sent at a rate of 128 kbps, a serialization delay is 64×8/128,000×1000=4 ms.

Transmission delay: is a period of time required for transmitting a signal on a transmission line between network elements, and is generally determined by an actual distance for which the signal is transmitted.

Switching delay: is a period of time from receiving a packet to sending the packet by a network element, where a relatively long switching delay is caused when packets queue due to congestion.

In the prior art, a delay between two network elements (subsequently referred to as a first network element and a second network element) is generally measured in the following manner: The first network element sends, to the second network element, a detection packet that carries a time stamp; the second network element immediately sends a response packet to the first network element after receiving the detection packet; after receiving the response packet, the first network element calculates a difference between the time stamp in the detection packet and a time of receiving the response packet, and uses the difference as a two-way delay between the first network element and the second network element; the second network element uses the difference between the time stamp in the detection packet and the time of receiving the probe packet as a one-way delay from the first network element to the second network element.

The method for implementing delay measurement requires that each measured network element has a measurement function, which leads to relatively complex implementation and relatively high actual deployment costs.

SUMMARY

Embodiments of the present invention provide a method, an apparatus, and a system for implementing delay measurement, to resolve a prior-art problem of complex implementation and relatively high deployment costs.

According to a first aspect, a method for implementing delay measurement is provided, where the method includes:

determining, by a measurement apparatus, a delay T0 generated when a first packet is transmitted at a first priority over a first loopback path, where the first loopback path consists of a first sub-path from the measurement apparatus to a first network element in a communications network and a second sub-path from the first network element to the measurement apparatus, the first priority is not a lowest priority, and no switching delay is generated when the first packet is transmitted at the first priority;

determining, by the measurement apparatus, a delay T1 generated when a second packet is transmitted over a second loopback path, where the second loopback path consists of the first sub-path, a third sub-path from the first network element to a second network element in the communications network, a fourth sub-path from the second network element to the first network element, and the second sub-path, the second packet is transmitted at the first priority over the first sub-path and the second sub-path and is transmitted at a second priority over the third sub-path and the fourth sub-path, and the second priority is not higher than the first priority; and determining, by the measurement apparatus according to T0 and T1, a delay between the first network element and the second network element.

According to the implementation manner of the first aspect of the present invention, a delay between any two network elements (that is, the first network element and the second network element) can be measured by implementing a measurement function only in the measurement apparatus. The measurement function does not need to be implemented in a measured network element, thereby resolving prior-art problems that because each measured network element needs to have the measurement function, implementation is relatively complex and actual deployment costs are relatively high.

The first priority is preferably the highest priority. When the first priority is higher, a probability of causing a switching delay is smaller when the first packet is transmitted at the first priority. When the first priority is the highest priority, a probability of causing a switching delay when the first packet is transmitted at the first priority may be considered as 0. Therefore, when the first priority is the highest priority, a measured delay is more correct.

In a first possible implementation manner of the first aspect, the determining, by the measurement apparatus according to T0 and T1, a delay between the first network element and the second network element specifically includes: determining, by the measurement apparatus, a two-way delay between the first network element and the second network element as a difference between T1 and T0.

The second priority may be specifically lower than the first priority, and the two-way delay determined in this case can reflect an actual network delay.

In a second possible implementation manner of the first aspect, the second priority is equal to the first priority, network elements that the third sub-path and the fourth sub-path pass through are the same, and the determining, by the measurement apparatus according to T0 and T1, a delay between the first network element and the second network element may specifically include:

determining, by the measurement apparatus, a delay T2 generated when a third packet is transmitted over a third loopback path, where the third loopback path consists of the first sub-path, the second sub-path, a to-be-measured sub-path, and a reference sub-path, the reference sub-path is the third sub-path or the fourth sub-path, a source network element on the to-be-measured sub-path is a destination network element on the reference sub-path, a destination network element on the to-be-measured sub-path is a source network element on the reference sub-path, the third packet is transmitted at a third priority over the to-be-measured sub-path of the third loopback path and is transmitted at the first priority over another sub-path of the third loopback path, and the third priority is lower than the first priority; and the determining, by the measurement apparatus according to T0 and T1, a delay between the first network element and the second network element specifically includes: determining, by the measurement apparatus, a one-way delay generated when a packet is transmitted at the third priority over the to-be-measured sub-path as $(2\times T2-T1-T0)/2$.

Because the third priority is lower than the first priority, the determined one-way delay can reflect an actual network delay.

According to a second aspect, a measurement apparatus for implementing delay measurement is provided, where the measurement apparatus includes: a first determining unit, a second determining unit, and a third determining unit;

the first determining unit is configured to determine a delay T0 generated when a first packet is transmitted at a first priority over a first loopback path, where the first loopback path consists of a first sub-path from the measurement apparatus to a first network element in a communications network and a second sub-path from the first network element to the measurement apparatus, and the first priority is not a lowest priority;

the second determining unit is configured to determine a delay T1 generated when a second packet is transmitted over a second loopback path, where the second loopback path consists of the first sub-path, a third sub-path from the first network element to a second network element in the communications network, a fourth sub-path from the second network element to the first network element, and the second sub-path, the second packet is transmitted at the first priority over the first sub-path and the second sub-path and is transmitted at a second priority over the third sub-path and the fourth sub-path, and the second priority is not higher than the first priority; and the third determining unit is configured to determine, according to T0 determined by the first determining unit and T1 determined by the second determining unit, a delay between the first network element and the second network element.

According to the measurement apparatus in the second aspect of the present invention, a delay between any two network elements (that is, the first network element and the second network element) can be measured by implementing a measurement function only in the measurement apparatus. The measurement function does not need to be implemented in a measured network element, thereby resolving prior-art problems that because each measured network element needs to have the measurement function, implementation is relatively complex and actual deployment costs are relatively high.

The first priority is preferably the highest priority. When the first priority is higher, a probability of causing a switching delay is smaller when the first packet is transmitted at the first priority. When the first priority is the highest priority, a probability of causing a switching delay when the first packet is transmitted at the first priority may be considered as 0. Therefore, when the first priority is the highest priority, a measured delay is more correct.

In a first possible implementation manner of the second aspect, the third determining unit is specifically configured to determine a two-way delay between the first network element and the second network element as a difference between T1 and T0.

The second priority may be specifically lower than the first priority, and the two-way delay determined in this case can reflect an actual network delay.

In a second possible implementation manner of the second aspect, the second priority is equal to the first priority, network elements that the third sub-path and the fourth sub-path pass through are the same, and the third determining unit includes a first determining subunit and a second determining subunit;

the first determining subunit is configured to determine a delay T2 generated when a third packet is transmitted over a third loopback path, where the third loopback path consists of the first sub-path, the second sub-path, a to-be-measured sub-path, and a reference sub-path, the reference sub-path is the third sub-path or the fourth sub-path, a source network element on the to-be-measured sub-path is a destination network element on the reference sub-path, a destination network element on the to-be-measured sub-path is a source network element on the reference sub-path, the third packet is transmitted at a third priority over the to-be-measured sub-path of the third loopback path and is transmitted at the first priority over another sub-path of the third loopback path, and the third priority is lower than the first priority; and the second determining subunit is configured to determine a one-way delay generated when a packet is transmitted at the third priority over the to-be-measured sub-path as $(2\times T2-T1-T0)/2$.

Because the third priority is lower than the first priority, the determined one-way delay can reflect an actual network delay.

According to a third aspect, a measurement system for implementing delay measurement is provided, where the measurement system includes the measurement apparatus and the communications network that are described in the second aspect or any possible implementation manner of the second aspect, the communications network includes a first network element and a second network element, and the measurement apparatus is connected to any network element of the communications network.

Further, the measurement system may further include a path determining apparatus; the measurement apparatus may be further configured to determine, by using the path determining apparatus, the first loopback path, the second loopback path and/or the third loopback path. The path determining apparatus may be specifically an SDN controller. In specific implementation, the path determining apparatus and the measurement apparatus may be implemented in a same physical device, or may be implemented in different physical devices.

According to the measurement system in the third aspect of the present invention, a delay between any two network elements (that is, the first network element and the second network element) can be measured by implementing a measurement function only in the measurement apparatus. The measurement function does not need to be implemented in a measured network element, thereby resolving prior-art problems that because each measured network element needs to have the measurement function, implementation is relatively complex and actual deployment costs are relatively high.

BRIEF DESCRIPTION OF DRAWINGS

To describe the technical solutions in the embodiments of the present invention more clearly, the following briefly introduces the accompanying drawings required for describing the embodiments.

FIG. 1 is a schematic diagram of a network structure of a system 100 for implementing delay measurement according to an embodiment of the present invention;

FIG. 2a, FIG. 2b, and FIG. 5a to FIG. 5c are schematic flowcharts of a method according to a first embodiment of the present invention;

FIG. 4 is a schematic diagram of delay calculation according to a first embodiment of the present invention;

DESCRIPTION OF EMBODIMENTS

The following describes the technical solutions in the embodiments of the present invention with reference to the accompanying drawings in the embodiments of the present invention.

FIG. 1 is a schematic diagram of a network structure of a system 100 for implementing delay measurement according to an embodiment of the present invention. The system 100 includes a measurement apparatus 110 and a communications network 120. The communications network 120 includes at least two network elements, where the measurement apparatus 110 is connected to any network element (for example, a network element P1) in the communications network 120. The communications network 120 may be specifically a data center network, a wide area network, a local area network, or the like. The network element in the communications network 120 may be specifically a router, a switch, or the like.

The measurement apparatus 110 may be configured to measure a two-way delay and a one-way delay between any two network elements (for example, a network element P2 and a network element P8) in the communications network 120.

The delay mainly includes three parts: a serialization delay, a transmission delay, and a switching delay. Delays (for example, the serialization delay and the transmission delay) other than the switching delay constitute a fixed delay, which generally does not change with a congestion status.

Figure 2B:
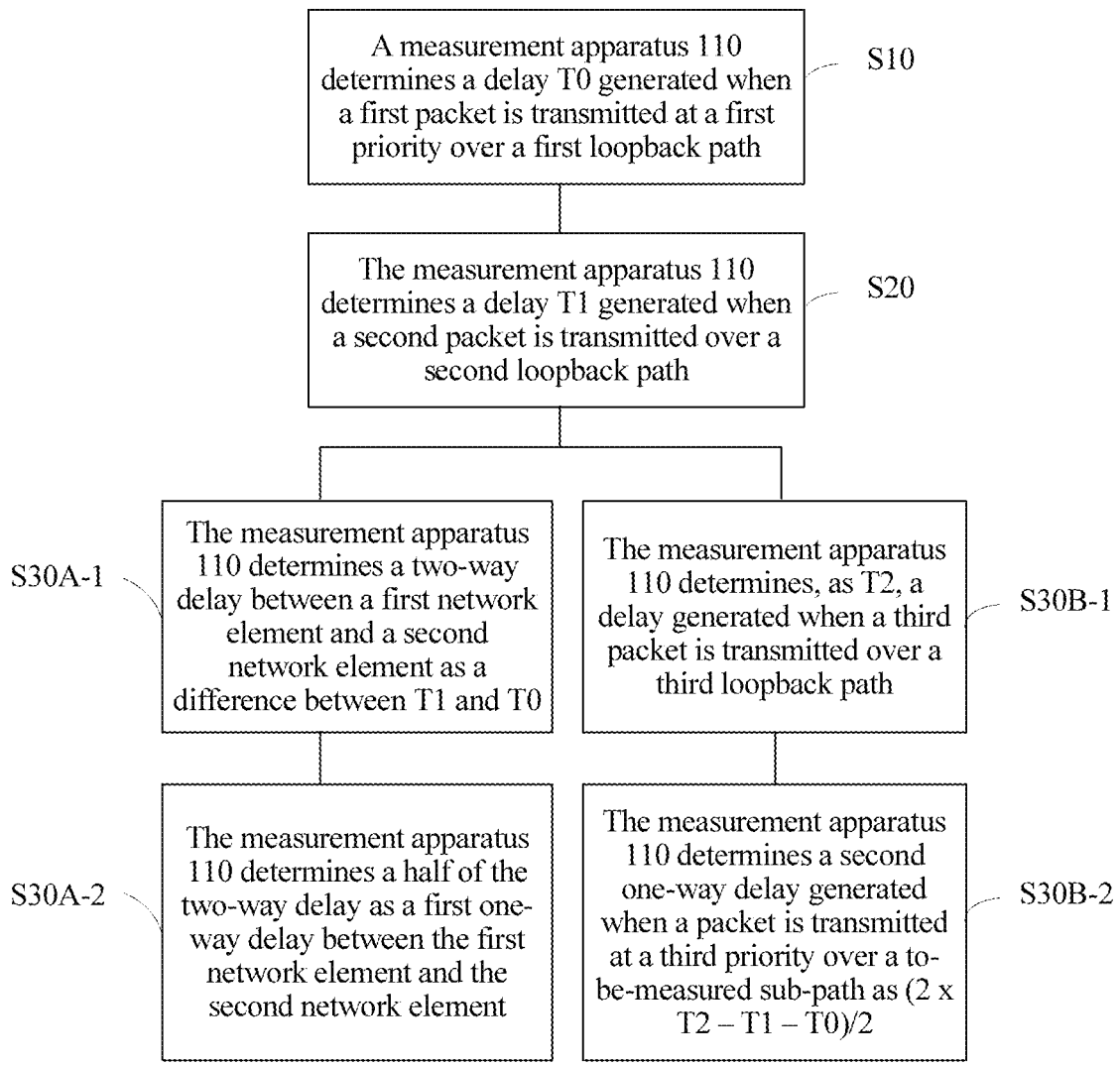

With reference to FIG. 2a, FIG. 2b, FIG. 3a, and FIG. 3b, the following describes a specific implementation method for measuring a delay between two network elements (subsequently referred to as a first network element and a second network element respectively, for example, the network element P2 and the network element P8) in the communications network. As shown in FIG. 2a, the method includes the following steps.

S10. The measurement apparatus 110 determines a delay T0 generated when a first packet is transmitted at a first priority over a first loopback path, where the first loopback path consists of a sub-path A from the measurement apparatus 110 to the first network element and a sub-path D from the first network element to the measurement apparatus 110, and the first priority is not a lowest priority.

It should be noted that, first, second, and third in the first packet and subsequently used second packet and third packet are only used to distinguish among packets used in different measurement processes, and do not indicate that there is a sequence relationship, a hierarchy relationship, or another dependency relationship between these packets.

The measurement apparatus 110 may specifically first determine the first loopback path according to network topology of the communications network by using a path determining apparatus. The path determining apparatus may be specifically a software-defined networking (SDN) controller. In specific implementation, the path determining apparatus and the measurement apparatus 110 may be implemented in a same physical device, or may be implemented in different physical devices.

Figure 3A:
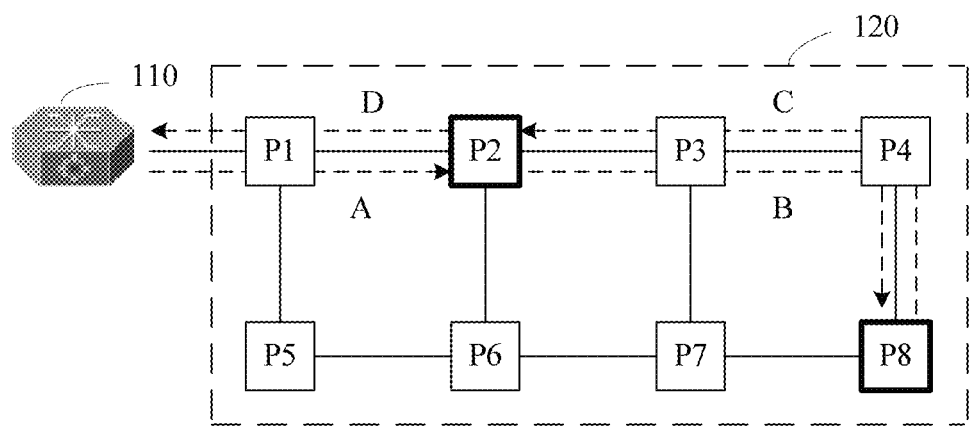
FIG. 3a and FIG. 3b are schematic diagrams of a loopback path according to a first embodiment of the present invention.

As shown in FIG. 3a, P2 is the first network element, and the first loopback path consists of the sub-path A and the sub-path D that are denoted by dashed lines, where network elements on the sub-path A are sequentially the measurement apparatus 110, the network element P1, and the network element P2, and network elements on the sub-path D are sequentially the network element P2, the network element P1, and the measurement apparatus 110.

The first priority is not the lowest priority, and is preferably a highest priority. The first priority is not the lowest priority, and when a network element (for example, the network element P1) that receives the first packet transmits the first packet at the first priority, relative to a packet transmitted at the lowest priority, the first packet transmitted at the first priority is sent preferably. Therefore, if congestion occurs, the packet transmitted at the lowest priority is generally put into a buffering queue to wait for forwarding, and the first packet transmitted at the first priority is generally not put into the buffering queue for queuing, but is directly forwarded. In this case, a switching delay is generally not generated when the first packet is transmitted at the first priority.

It may be understood that when the first priority is higher, a probability of causing a switching delay is smaller when the first packet is transmitted at the first priority. When the first priority is the highest priority, a probability of causing a switching delay when the first packet is transmitted at the first priority may be considered as 0. Therefore, when the first priority is the highest priority, a measured delay is more correct.

S20. The measurement apparatus 110 determines a delay T1 generated when a second packet is transmitted over a second loopback path, where the second loopback path consists of the sub-path A from the measurement apparatus 110 to the first network element, a sub-path B from the first network element to the second network element, a sub-path C from the second network element to the first network element, and the sub-path D from the first network element to the measurement apparatus 110, where a packet that is transmitted over the second loopback path is transmitted at the first priority over the sub-paths A and D and is transmitted at a second priority over the sub-paths B and C.

The sub-path B and the sub-path C may be specifically determined by the measurement apparatus 110 according to the network topology of the communications network by using the path determining apparatus, or may be entered by a user. As shown in FIG. 3a, P2 is the first network element, P8 is the second network element, and the second loopback path consists of the sub-paths A, B, C, and D that are denoted by dashed lines, where network elements on the sub-path B are sequentially network elements P2, P3, P4, and P8, and network elements on the sub-path C are sequentially network elements P8, P4, P3, and P2.

The second priority is not higher than the first priority, and may be specifically equal to the first priority, for example, both the first priority and the second priority are the highest priority; or the second priority may be lower than the first priority, for example, the first priority is the highest priority, and the second priority is the lowest priority.

S30. The measurement apparatus 110 determines a delay between the first network element and the second network element according to T0 and T1.

It should be noted that there is no specific sequence between steps S10 and S20.

According to the first embodiment of the present invention, the measurement apparatus is connected to the network elements in the communications network, and a delay between any two network elements (that is, the first network element and the second network element) in the communications network can be measured by performing step S10 to step S30. A measurement function needs to be implemented only in the measurement apparatus, and the measurement function does not need to be implemented in a measured network element, thereby resolving prior-art problems of relatively complex implementation and relatively high actual deployment costs.

With reference to FIG. 2b, the following describes a specific implementation manner of measuring different delays between two network elements in the communications network.

As shown in FIG. 2b, in one specific implementation manner, step S30 specifically includes step S30A-1 and S30A-2. T0 determined in step S10 and T1 determined in S20 may be used to determine a two-way delay and a first one-way delay between the first network element and the second network element.

S30A-1. The measurement apparatus 110 determines the two-way delay between the first network element and the second network element as a difference between T1 and T0.

The first priority is not the lowest priority, and when a network element (for example, the network element P1) that receives the packet transmits the packet at the first priority, relative to a packet transmitted at the lowest priority, the packet transmitted at the first priority is sent preferably. Therefore, if congestion occurs, the packet transmitted at the lowest priority is generally put into a buffering queue to wait for forwarding, and the first packet transmitted at the first priority is generally not put into the buffering queue for queuing, but is directly forwarded. Therefore, a switching delay is generally not generated when a packet is transmitted at the first priority, and delays generated when packets are transmitted in succession at the first priority over a same path generally do not change with a congestion status. In this case, it may be considered that a delay generated when a packet is transmitted at the first priority over the sub-path A and sub-path D of the second loopback path is the same as a delay generated when a packet is transmitted at the first priority over the first loopback path; therefore, the difference between T1 and T0 may be determined as the two-way delay between the first network element and the second network element.

If the second priority is the same as the first priority (for example, both are the highest priority), the determined two-way delay generally does not include the switching delay, and therefore may be referred to as a fixed delay. In addition, when the second priority is the same as the first priority, and the sub-path B and sub-path C pass through a same network element, step S30A-2 may be further performed: The measurement apparatus 110 determines a half of the two-way delay as the first one-way delay (also referred to as a one-way fixed delay) between the first network element and the second network element.

In a practical communication process, a packet is not transmitted at a highest priority in the communications network 120 generally. Therefore, when the second priority is lower than the first priority (for example, the first priority is the highest priority, and the second priority is the lowest priority), the determined two-way delay can reflect an actual network delay, and therefore may be referred to as a common delay.

If there are multiple transmission paths between the first network element and the second network element, for example, the first network element may send a packet to the second network element on the sub-path B and a sub-path X, and the second network element may send a packet to the first network element on the sub-path C and a sub-path Y, the measurement apparatus 110 may separately determine loopback sub-paths A→B→Y→D, A→X→C→D, and A→X→Y→D, and perform steps S10 to S30A to separately determine two-way delays generated when packets are transmitted on different paths between the first network element and the second network element.

In conclusion, according to one implementation manner of the first embodiment of the present invention, the measurement apparatus is connected to the network elements in the communications network, and a two-way delay between any two network elements (that is, the first network element and the second network element) in the communications network may be measured by performing step S10, step S20, step S30A-1, and step S30A-2. A measurement function needs to be implemented only in the measurement apparatus, and the measurement function does not need to be implemented in a measured network element, thereby resolving prior-art problems of relatively complex implementation and relatively high actual deployment costs.

As shown in FIG. 2b, in another specific implementation manner, step S30 specifically includes step S30B-1 and step S30B-2. On a premise that the second priority is the same as the first priority and the sub-path B and the sub-path C pass through a same network element, T0 determined in step S10 and T1 determined in step S20 may be used to determine a second one-way delay (also referred to as a common one-way delay) between the first network element and the second network element.

S30B-1. The measurement apparatus 110 determines, as T2, a delay generated when a third packet is transmitted over a third loopback path, where the third loopback path consists of the sub-path A, the sub-path D, a to-be-measured sub-path, and a reference sub-path, the reference sub-path is the sub-path B or the sub-path C, a source network element on the to-be-measured sub-path is a destination network element on the reference sub-path, a destination network element on the to-be-measured sub-path is a source network element on the reference sub-path, the third packet is transmitted at a third priority over the to-be-measured sub-path of the third loopback path and is transmitted at the first priority over another sub-path of the third loopback path, and the third priority is lower than the first priority.

It should be noted that, in this embodiment of the present invention, for a sub-path from one network element to another network element, the network element is a source network element on the sub-path, and the another network element is a destination network element on the sub-path. For example, for the sub-path A from the measurement apparatus 110 to the first network element, the measurement apparatus 110 is a source network element on the sub-path A, and the first network element is a destination network element on the sub-path A.

In one case, if the reference sub-path is the sub-path B, the source network element on the reference sub-path is specifically the first network element, and the destination network element is specifically the second network element. Correspondingly, the source network element on the to-be-measured sub-path is the second network element, and the destination network element is the first network element.

In another case, if the reference sub-path is the sub-path C, the source network element on the reference sub-path is specifically the second network element, and the destination network element is specifically the first network element. Correspondingly, the source network element on the to-be-measured sub-path is the first network element, and the destination network element is the second network element.

Figure 3B:
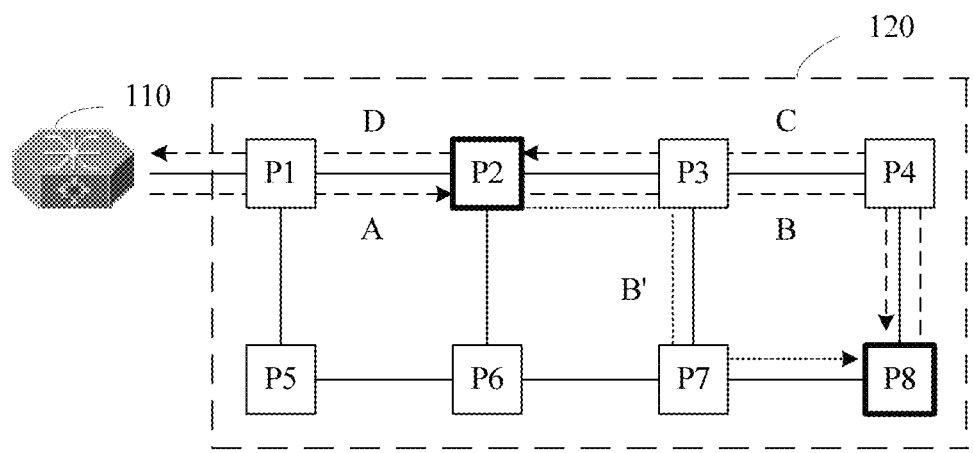

As shown in FIG. 3*b*, the reference sub-path is the sub-path C; in this case, the source network element on the reference sub-path is the network element P8, and the destination network element is the network element P2. Correspondingly, the to-be-measured sub-path may be any path, such as the sub-path B or a sub-path W, from the network element P2 to the network element P8, where the source network element on the to-be-measured sub-path is P2, and the destination network element is P8.

S30B-2. The measurement apparatus 110 determines a second one-way delay generated when a packet is transmitted at the third priority over the to-be-measured sub-path as $(2 \times T2 - T1 - T0)/2$.

It should be noted that there is no specific sequence between step S10, step S20, and step S30B-1, provided that before step S30B-2 is performed, T0, T1, and T2 are determined by performing step S10, step S20, and step S30B-1.

As shown in FIG. 4, a deducing process of $D1=(2 \times T2-T1-T0)/2$ is as follows:

$$2 \times D0 = T1 - T0; \text{ and} \qquad \text{Equation 1:}$$

$$D1 + D0 = T2 - T0, \text{ where} \qquad \text{Equation 2:}$$

D0 indicates the first one-way delay, and D1 indicates the second one-way delay, and $D1=(2 \times T2-T1-T0)/2$ may be obtained according to an equation set including equation 1 and equation 2.

If there are multiple transmission paths between the first network element and the second network element, for example, the first network element may send a packet to the second network element on the sub-path B and the sub-path W, and the second network element may send a packet to the first network element on the sub-path C and a sub-path C, by performing step S10, step S20, step S30B-1, and step S30B-2, the measurement apparatus 110 may use the sub-path B as the reference sub-path to determine a second one-way delay generated when a packet is transmitted over the sub-path C or C between the first network element and the second network element, or may use the sub-path C as the reference sub-path to determine a second one-way delay generated when a packet is transmitted over the sub-path B or B' between the first network element and the second network element.

In conclusion, according to the another implementation manner of the first embodiment of the present invention, the measurement apparatus is connected to the network elements in the communications network, and a second one-way delay (also referred to as a common one-way delay) between any two network elements (that is, the first network element and the second network element) in the communications network may be measured by performing step S10, step S20, step S30B-1, and step S30B-2. A measurement function does not need to be implemented in a measured network element, thereby resolving prior-art problems of relatively complex implementation and relatively high actual deployment costs.

In addition, according to the solution provided in the background of the present invention, during delay measurement, a time at which a packet leaves from one network element is used as a starting time to calculate a delay, and a switching delay generated when the packet queues in the network element is not considered. Therefore, the measured delay is not precise. By contrast, in the solution of the present patent, during delay measurement, for example, when a common two-way delay is measured by performing step S10, step S20, step S30A-1, and step S30A-2 or a common one-way delay is measured by performing step S10, step S20, step S30B-1, and step S30B-2. A time at which a packet arrives at a source network element on a to-be-measured sub-path is used as a starting time to calculate a delay, and a switching delay generated when the packet queues in the source network element on the to-be-measured sub-path is considered. Therefore, the measured delay is more precise.

As shown in FIG. 5*a*, in step S10, the measurement apparatus 110 may specifically determine T0 in the following implementation manner:

Step S10-1. The measurement apparatus 110 sends the first packet, where the first packet includes routing information of the first loopback path, the routing information in the first packet is used to instruct a network element on the first loopback path to route the first packet along the first loopback path, the first packet further includes priority information, and the priority information in the first packet is used to instruct the network element on the first loopback path to transmit the first packet at the first priority over the first loopback path.

Step S10-2. The measurement apparatus 110 receives the first packet returned over the first loopback path.

Step S10-3. The measurement apparatus 110 determines T0 as a difference between a time of receiving the first packet and a time of sending the first packet.

In specific implementation, the measurement apparatus 110 may record the time of sending the first packet, and use, when receiving the first packet that is transmitted over the first loopback path, the recorded time to calculate T0; or may add a time stamp to the first packet (that is, add the time of sending the first packet to the first packet), and use, when receiving the first packet, the time stamp in the first packet to calculate T0.

In addition, if the measurement apparatus 110 is directly connected to the first network element, for example, as shown in FIG. 1, the first network element is the network element P1, in step S10, the measurement apparatus 110 may further determine T0 in a ping manner. Specifically, the measurement apparatus 110 sends an Internet Control Message Protocol (ICMP) request packet to the first network element. After receiving an ICMP response packet returned by the first network element, the measurement apparatus 110 calculates a difference between a time of sending the ICMP request packet and a time of receiving the response packet, and uses the difference as T0.

Figure 5B:
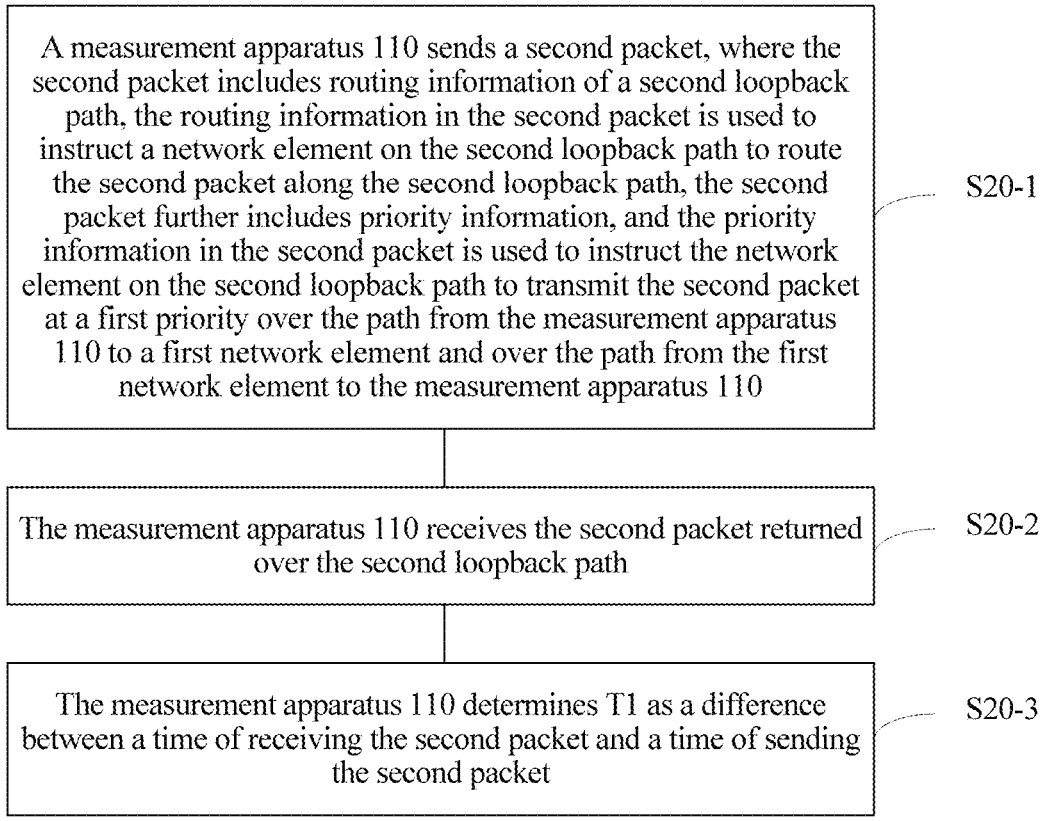

As shown in FIG. 5b, in step S20, the measurement apparatus 110 may specifically determine T1 in the following implementation manner:

S20-1. The measurement apparatus 110 sends the second packet, where the second packet includes routing information of the second loopback path, the routing information in the second packet is used to instruct a network element on the second loopback path to route the second packet along the second loopback path, the second packet further includes priority information, and the priority information in the second packet is used to instruct the network element on the second loopback path to transmit the second packet at the first priority over the path from the measurement apparatus 110 to the first network element and over the path from the first network element to the measurement apparatus 110.

S20-2. The measurement apparatus 110 receives the second packet returned over the second loopback path.

S20-3. The measurement apparatus 110 determines T1 as a difference between a time of receiving the second packet and a time of sending the second packet.

Figure 5C:
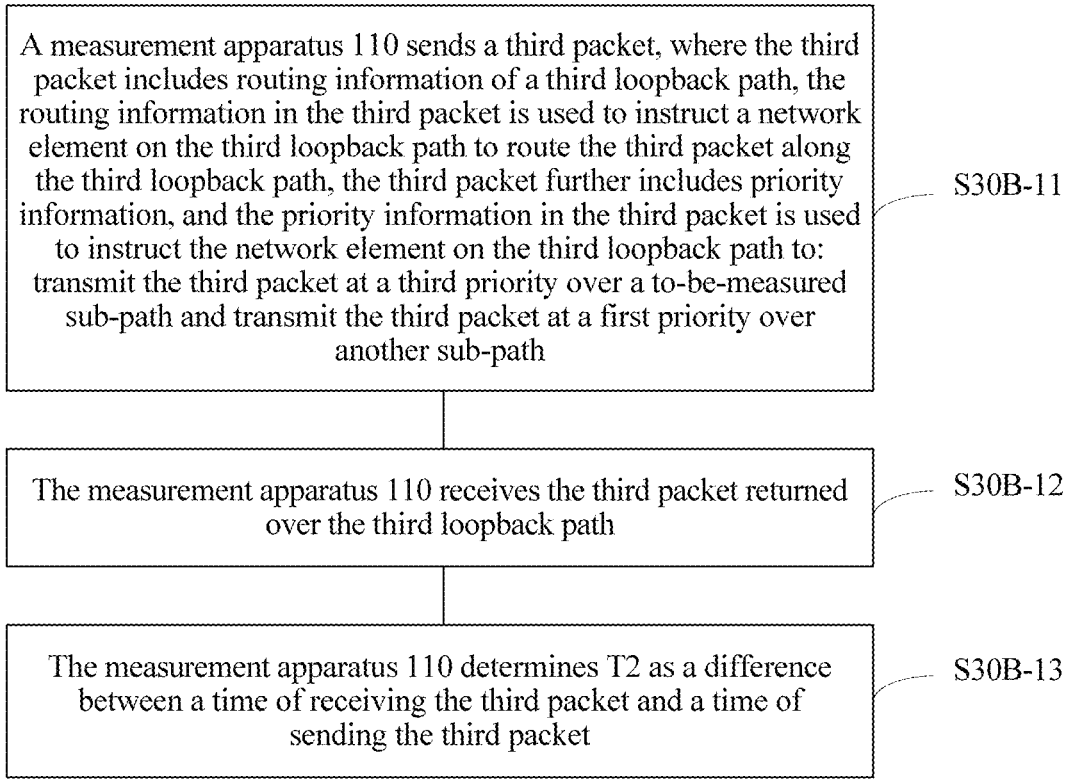

As shown in FIG. 5c, in step S30B-1, the measurement apparatus 110 may specifically determine T2 in the following implementation manner:

S30B-11. The measurement apparatus 110 sends the third packet, where the third packet includes routing information of the third loopback path, the routing information in the third packet is used to instruct a network element on the third loopback path to route the third packet along the third loopback path, the third packet further includes priority information, and the priority information in the third packet is used to instruct the network element on the third loopback path to: transmit the third packet at the third priority over the to-be-measured sub-path and transmit the third packet at the first priority over the another sub-path.

S30B-12. The measurement apparatus 110 receives the third packet returned over the third loopback path.

S30B-13. The measurement apparatus 110 determines T2 as a difference between a time of receiving the third packet and a time of sending the third packet.

The foregoing implementation manners of determining T0, T1, and T2 may be specifically implemented by using a segment routing (SR) technology.

For ease of description, the first loopback path, the second loopback path, or the third loopback path is subsequently referred to as a target loopback path, and the first packet, the second packet, or the third packet is referred to as a target packet. When the target packet is the first packet, the target loopback path is specifically the first loopback path; when the target packet is the second packet, the target loopback path is specifically the second loopback path; and when the target packet is the third packet, the target loopback path is specifically the third loopback path.

When the foregoing implementation manners of determining T0, T1, and T2 are implemented by using the segment routing technology, the target packet (for example, the second packet) specifically includes identifiers of segments on the target loopback path (for example, the second loopback path) according to a routing sequence and a priority for transmitting the target packet over each segment.

Figure 6:
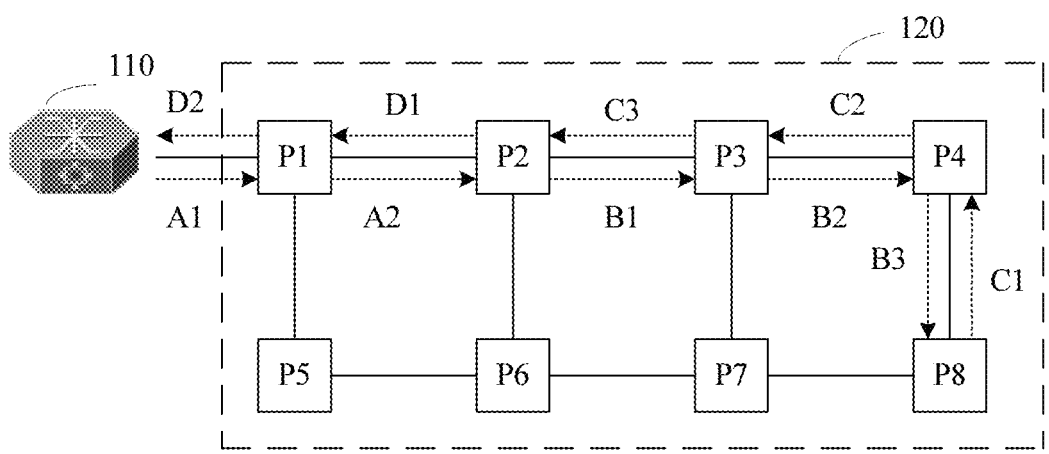
FIG. 6 is a schematic diagram of a segment on a loopback path according to a first embodiment of the present invention.

The second loopback path is used as an example. As shown in FIG. 6, the segments on the second loopback path are sequentially A1→A2→B1→B2→B3→C1→C2→C3→D1→D2 according to the routing sequence.

When receiving the target packet, a source network element on each segment routes the target packet to a destination network element on the corresponding segment at a priority of the corresponding segment. For example, when receiving the first packet sent by the measurement apparatus 110, a source network element P1 on segment A2 routes the first packet to a destination network element P2 on segment A2 at the first priority.

An identifier of the segment may be specifically an egress port number of a source network element on the segment, or may be an identifier of a destination network element on the segment. In the implementation solution of the present patent, the identifier of the segment is preferably the egress port number of the source network element on the segment.

Further, the foregoing implementation manners may be specifically implemented by using an SR technology based on Multiprotocol Label Switching (MPLS).

A label in a packet header is used to forward data in an MPLS network. A path through which a packet passes in the MPLS network is referred to as a label switched path (LSP), and is a one-way path.

Figure 7:
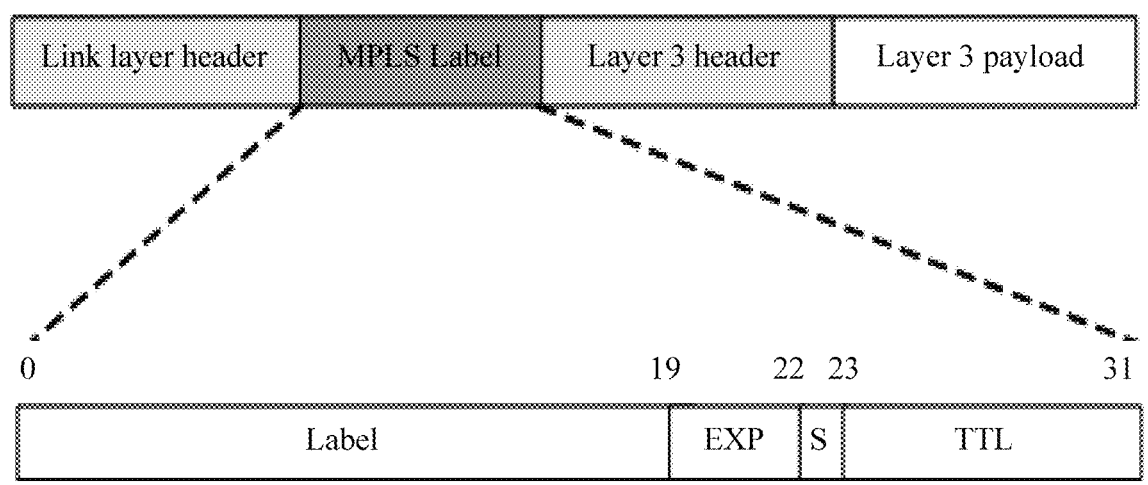
FIG. 7 is a schematic structural diagram of a packet header according to a first embodiment of the present invention.

As shown in FIG. 7, the packet header includes an MPLS Label header, and the MPLS Label header includes four fields, where a Label field is used to carry an identifier of a segment, and an Exp field may be used to carry a priority of the packet. By specifying different E×P values for labels in a label stack, it can be ensured that the packet is transmitted at a corresponding priority over each segment of LSP. When a packet is routed according to a label stack in the packet, if the packet is transmitted at different priorities on two neighboring segments, this priority change of the packet is referred to as discoloration, and a network element on which discoloration occurs is referred to as a discoloration point.

In the MPLS network, multiple labels may be carried in a packet. These labels exist in a "stack" manner and constitute a label stack. A network element that receives the packet determines how to forward the packet according to a topmost label of the stack.

When SR is implemented in the MPLS network, two types of segments are defined: a node segment and an adjacency segment. Both the two types of segments are represented by using the MPLS label. A label corresponding to the node segment is referred to as a node label, and a label corresponding to the adjacency segment is referred to as a link label.

Node label: One node label is allocated to each network element in the network, and is globally unique within an Interior Gateway Protocol (IGP) domain. When a network element receives a packet, if a topmost label of a label stack of the packet is a node label, the packet is routed along a shortest path to a network element corresponding to the node label.

Link label: In the network, each network element allocates one link label to each egress port of the network element. When a network element receives a packet, if a topmost label of a label stack of the packet is a link label, the packet is directly forwarded through an egress port identified by the link label.

When the foregoing implementation manners are implemented by using the SR technology based on MPLS, the measurement apparatus 110 adds an MPLS label (including an identifier and an priority that are of each segment) of each segment on the target loopback path to a label stack of the target packet. Each network element on the target loopback path processes a label, in the label stack, of a segment whose source network element is the network element, and sends the target packet according to a priority of the segment by using the segment. Specifically, according to a topmost label, the measurement apparatus 110 sends, at a priority in the topmost label, the target packet to a destination network element (for example, the network element P1) of a segment corresponding to the topmost label. Subsequently, when receiving the target packet, each network element (for example, the network element P1) on the target loopback path pops up the topmost label of the label stack of the target packet, and sends, at a priority in a current topmost label, the target packet to a destination network element (for example, the network element P2) of a segment corresponding to the current topmost label.

Figure 8:
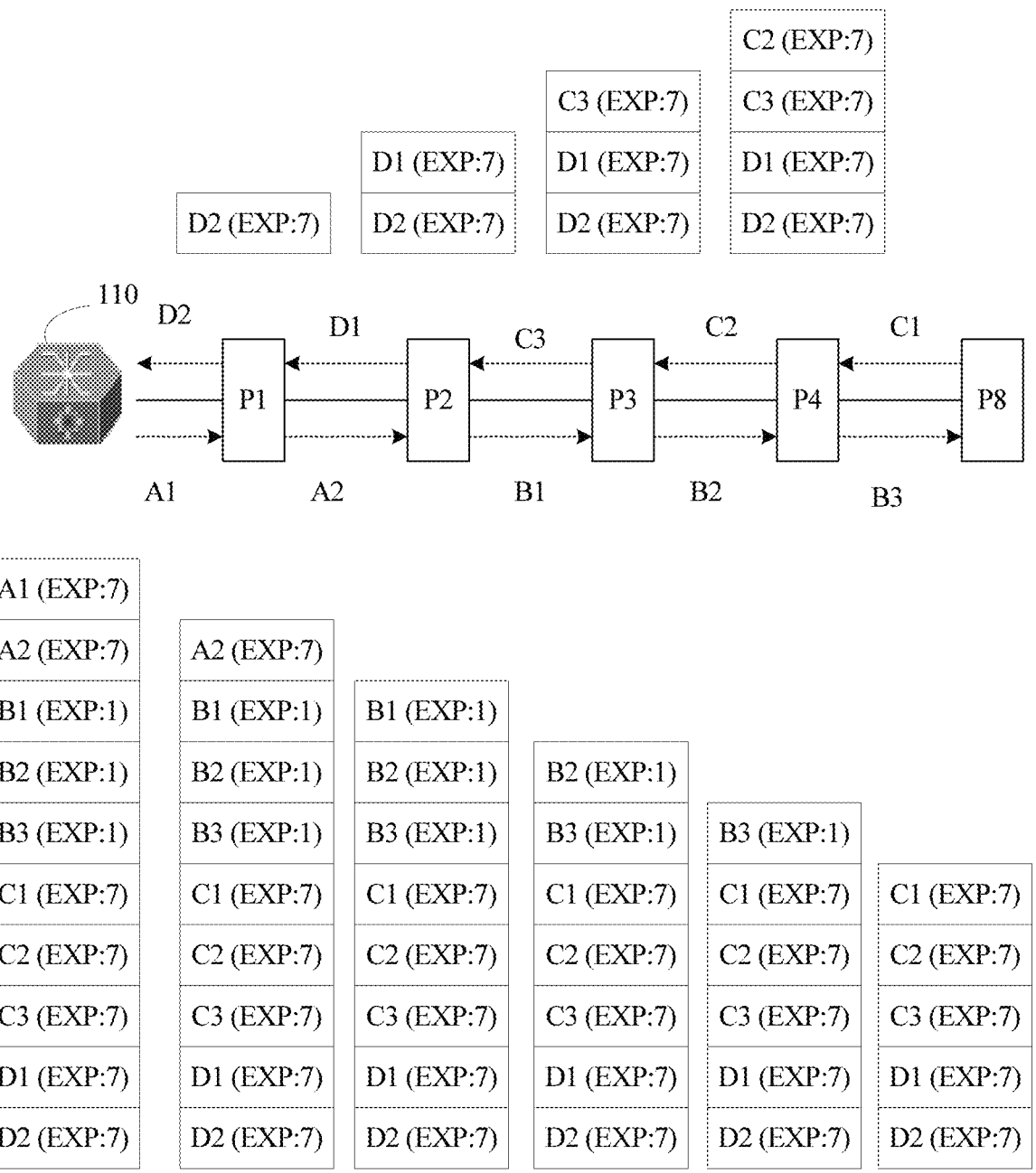
FIG. 8 is a schematic diagram of a packet sending process according to a first embodiment of the present invention.

With reference to FIG. 8, the following describes a process of transmitting the third packet over the third loopback path.

The measurement apparatus 110 adds an MPLS label (including an identifier and a priority that are of each segment) of each segment on the third loopback path to the label stack of the target packet. As shown in FIG. 8, EXP:7 indicates the highest priority, and EXP:1 indicates the lowest priority. It may be learned, according to the label stack, that the third packet is transmitted at different priorities on paths before and after the source network element (for example, the network element P2) of the to-be-measured sub-path (for example, the sub-path B), and is also transmitted at different priorities on paths before and after the destination network element (for example, the network element P8) of the to-be-measured sub-path. That is, the third packet discolors on the source network element and the destination network element that are of the to-be-measured sub-path, and the source network element and the destination network element that are of the to-be-measured sub-path are discoloration points.

The measurement apparatus 110 determines an egress port of the third packet according to segment identification information A1 in a topmost label, and transmits the third packet to the network element P1 at a priority 7 through the determined egress port according to segment priority information "EXP:7" in the topmost label.

After receiving the third packet, the network element P1 pops up a topmost label "A1 (EXP:7)" in the third packet, determines an egress port of the third packet according to segment identification information A2 in a current topmost label, and transmits the third packet to the network element P2 at the priority 7 through the determined egress port according to segment priority information "EXP:7" in the topmost label.

The third packet is routed by P2, P3, P4, P8, P4, P3, P2, and P1 in successive subsequently and returned to the measurement apparatus. The subsequent routing process is similar to the foregoing process, and details are not repeatedly described.

It should be noted that, in the foregoing process, the network element that uses the topmost label to forward a packet does not delete the used topmost label. H; instead, a next network element that receives the packet first pops up the topmost label used by the network element, and forwards the packet according to a current topmost label obtained after the pop-up operation is executed. In specific implementation, alternatively, each network element that uses a topmost label to forward a packet deletes the used topmost label before forwarding. Correspondingly, a next network element may directly forward the packet according to a topmost label, and delete the used topmost label before forwarding.

Figure 9A:
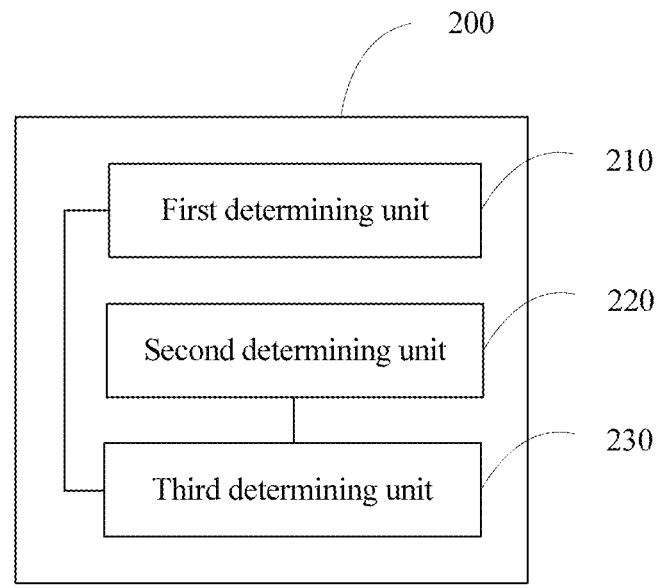
FIG. 9a and FIG. 9b are schematic structural diagrams of a measurement apparatus 200 according to a second embodiment of the present invention.

According to the first embodiment of the present invention, a second embodiment of the present invention proposes a measurement apparatus 200. As shown in FIG. 9a, the measurement apparatus 200 includes: a first determining unit 210, a second determining unit 220, and a third determining unit 230.

The first determining unit 210 is configured to determine a delay T0 generated when a first packet is transmitted at a first priority over a first loopback path, where the first loopback path consists of a first sub-path (for example, the sub-path A shown in FIG. 3a) from the measurement apparatus to a first network element in a communications network, and a second sub-path (for example, the sub-path D shown in FIG. 3a) from the first network element to the measurement apparatus, and the first priority is not a lowest priority and is preferably the highest priority.

The second determining unit 220 is configured to determine a delay T1 generated when a second packet is transmitted over a second loopback path, where the second loopback path consists of the first sub-path, a third sub-path (for example, the sub-path B shown in FIG. 3a) from the first network element to a second network element in the communications network, a fourth sub-path (for example, the sub-path C shown in FIG. 3a) from the second network element to the first network element, and the second sub-path, the second packet is transmitted at the first priority over the first sub-path and the second sub-path and is transmitted at a second priority over the third sub-path and the fourth sub-path, and the second priority is not higher than the first priority.

The third determining unit 230 is configured to determine, according to T0 determined by the first determining unit 210 and T1 determined by the second determining unit 220, a delay between the first network element and the second network element.

In one implementation manner, the second priority is equal to the first priority, and network elements that the third sub-path and the fourth sub-path pass through are the same.

Figure 9B:
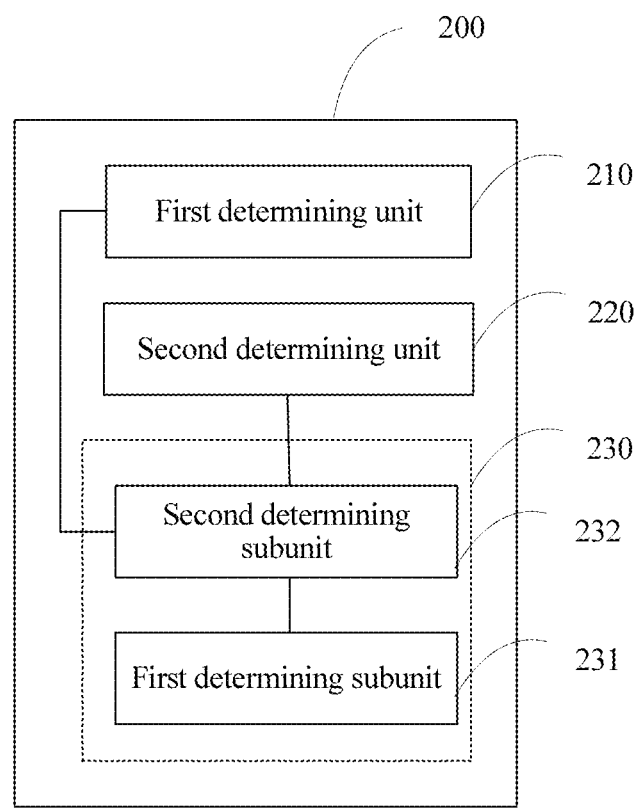

Correspondingly, as shown in FIG. 9b, the third determining unit specifically includes a first determining subunit 231 and a second determining subunit 232.

The first determining subunit 231 is configured to determine a delay T2 generated when a third packet is transmitted over a third loopback path, where the third loopback path consists of the first sub-path, the second sub-path, a to-be-measured sub-path, and a reference sub-path, the reference sub-path is the third sub-path or the fourth sub-path, a source network element on the to-be-measured sub-path is a destination network element on the reference sub-path, a destination network element on the to-be-measured sub-path is a source network element on the reference sub-path, the third packet is transmitted at a third priority over the to-be-measured sub-path of the third loopback path and is transmitted at the first priority over another sub-path of the third loopback path, and the third priority is lower than the first priority.

The second determining subunit 232 is configured to determine a second one-way delay generated when a packet is transmitted at the third priority over the to-be-measured sub-path as $(2 \times T2 - T1 - T0)/2$.

A functional unit described in the second embodiment of the present invention may be used to implement operations executed by the measurement apparatus 110 in the method in the first embodiment. Specifically, the first determining unit 210 may be configured to perform step S10 performed by the measurement apparatus 110 in the method in the first embodiment; the second determining unit 220 may be configured to perform step S20 performed by the measurement apparatus 110 in the method in the first embodiment; and the third determining unit 230 may be configured to perform step S30 performed by the measurement apparatus 110 in the method in the first embodiment, where the first determining subunit 231 may be configured to perform step S30B-1 performed by the measurement apparatus 110 in the method in the first embodiment, and the second determining subunit 232 may be configured to perform step S30B-2 performed by the measurement apparatus 110 in the method in the first embodiment.

According to the measurement apparatus 200 provided in the second embodiment of the present invention, a delay between any two network elements (that is, a first network element and a second network element) in the communications network can be measured by implementing a measurement function only in the measurement apparatus 200. The measurement function does not need to be implemented in a measured network element, thereby resolving prior-art problems that because each measured network element needs to have the measurement function, implementation is relatively complex and actual deployment costs are relatively high.

Figure 10:
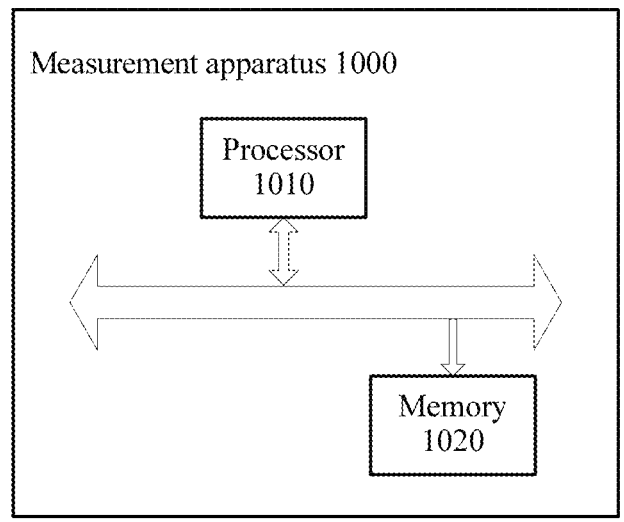
FIG. 10 is a schematic structural diagram of a measurement apparatus 1000 according to a third embodiment of the present invention.

According to the first embodiment of the present invention, a third embodiment of the present invention provides a measurement apparatus 1000. As shown in FIG. 10, the measurement apparatus 1000 includes a processor 1010 and a memory 1020, where mutual communication between the processor 1010 and the memory 1020 is implemented by using a bus.

The memory 1020 is configured to store a computer operation instruction, and may be specifically a high-speed RAM memory, or may be a non-volatile memory.

The processor 1010 is configured to execute the computer operation instruction stored in the memory 1020. The processor 1010 may be specifically a central processing unit (CPU), or an application-specific integrated circuit (ASIC), or be configured as one or more integrated circuits that implement the embodiments of the present invention.

The processor 1010 executes the computer operation instruction, so that the measurement apparatus 1000 executes operations executed by the measurement apparatus 110 in the method in the first embodiment.

According to the measurement apparatus 1000 provided in the third embodiment of the present invention, a delay between any two network elements (that is, a first network element and a second network element) in the communications network can be measured by implementing a measurement function only in the measurement apparatus 1000. The measurement function does not need to be implemented in a measured network element, thereby resolving prior-art problems that because each measured network element needs to have the measurement function, implementation is relatively complex and actual deployment costs are relatively high.

Figure 11:
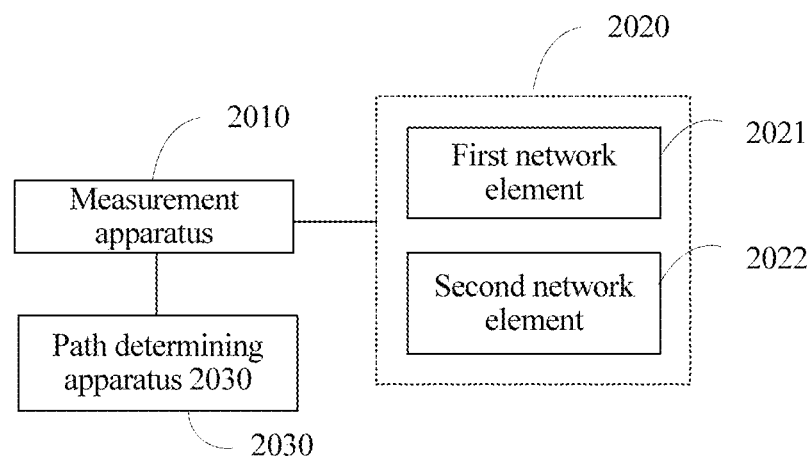
FIG. 11 is a schematic structural diagram of a measurement system 2000 according to a fourth embodiment of the present invention.

According to the first embodiment of the present invention, a fourth embodiment of the present invention proposes a measurement system 2000. As shown in FIG. 11, the measurement system 2000 includes a measurement apparatus 2010 and a communications network 2020. The communications network 2020 includes a first network element 2021 and a second network element 2022, and the measurement apparatus 2010 is connected to any network element (for example, the first network element 2021) in the communications network 2020.

The measurement apparatus 2010 may be specifically the measurement apparatus 200 provided in the second embodiment or the measurement apparatus 1000 provided in the third embodiment.

Further, the measurement system 2000 may further include a path determining apparatus 2030. The measurement apparatus 2010 may be further configured to determine, by using the path determining apparatus 2030, the first loopback path, the second loopback path and/or the third loopback path. The path determining apparatus may be specifically an SDN controller. In specific implementation, the path determining apparatus 2030 and the measurement apparatus 2010 may be implemented in a same physical device, or may be implemented in different physical devices.

According to the measurement system 2000 provided in the fourth embodiment of the present invention, a delay between any two network elements (that is, the first network element 2021 and the second network element 2022) in the communications network 2020 can be measured by implementing a measurement function only in the measurement apparatus 2010. The measurement function does not need to be implemented in a measured network element, thereby resolving prior-art problems that because each measured network element needs to have the measurement function, implementation is relatively complex and actual deployment costs are relatively high.

Persons of ordinary skill in the art may be aware that, in combination with the examples described in the embodiments disclosed in this specification, units and algorithm steps may be implemented by electronic hardware or a combination of computer software and electronic hardware. Whether the functions are implemented by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is only exemplary. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are only specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for implementing delay measurement, wherein the method comprises:
    determining, by a measurement apparatus, a delay T0 for transmitting a first packet at a first priority over a first loopback path, wherein the first loopback path consists of a first sub-path from the measurement apparatus to a first network element in a communications network and a second sub-path from the first network element to the measurement apparatus, and the first priority is not a lowest priority for transmission in the communications network;
    determining, by the measurement apparatus, a delay T1 for transmitting a second packet over a second loopback path, wherein the second loopback path consists of the first sub-path, a third sub-path from the first network element to a second network element in the communications network, a fourth sub-path from the second network element to the first network element, and the second sub-path, wherein the second packet is transmitted at the first priority over the first sub-path and the second sub-path, the second packet is transmitted at a second priority over the third sub-path and the fourth sub-path, and the second priority is not higher than the first priority; and
    determining, by the measurement apparatus according to T0 and T1, a delay between the first network element and the second network element;
    wherein determining the delay T1 comprises:
    sending, by the measurement apparatus, the second packet, wherein the second packet comprises routing information of the second loopback path, wherein the routing information in the second packet is configured to instruct a network element on the second loopback path to route the second packet along the second loopback path, wherein the second packet further comprises priority information, the priority information indicating the first sub-path and the second sub-path correspond to the first priority such that the second packet is transmitted at the first priority over the first sub-path and the second sub-path, and the third sub-path and the fourth sub-path correspond to the second priority such that the second packet is transmitted at the second priority over the third sub-path and the fourth sub-path; and
    receiving, by the measurement apparatus, the second packet returned over the second loopback path,
    wherein the delay T1 is determined based on a time difference between when the second packet was received and when the second packet was sent.

2. The method according to claim 1, wherein the first priority is a highest priority for transmission in the communications network.

3. The method according to claim 1, wherein determining the delay between the first network element and the second network element comprises:
    determining, by the measurement apparatus, a two-way delay between the first network element and the second network element as a difference between T1 and T0.

4. The method according to claim 3, wherein the second priority is equal to the first priority.

5. The method according to claim 4, wherein network elements of the third sub-path and network elements of the fourth sub-path are the same; and
    a first one-way delay between the first network element and the second network element corresponds to a half of the two-way delay.

6. The method according to claim 1, wherein determining the delay T0 comprises:
    sending, by the measurement apparatus, the first packet, wherein the first packet comprises routing information of the first loopback path, the routing information in the first packet is configured to instruct a network element on the first loopback path to route the first packet along the first loopback path, wherein the first packet further comprises priority information, the priority information in the first packet instructing the network element on the first loopback path to transmit the first packet at the first priority over the first loopback path; and
    receiving, by the measurement apparatus, the first packet returned over the first loopback path,
    wherein the delay T0 is determined based on a time difference between when the first packet was received and when the first packet was sent.

7. The method according to claim 1, wherein
    the second packet comprises identifiers of segments on the second loopback path that are arranged according to a routing sequence and a priority for transmitting the second packet over each segment.

8. The method according to claim 1, wherein the second priority is equal to the first priority, wherein network elements of the third sub-path and network elements of the fourth sub-path are the same, and wherein
    determining the delay between the first network element and the second network element comprises:
    determining, by the measurement apparatus, a delay T2 generated when a third packet is transmitted over a third loopback path, wherein the third loopback path consists of the first sub-path, the second sub-path, a to-be-measured sub-path, and a reference sub-path, wherein the reference sub-path is the third sub-path or the fourth sub-path, a source network element on the to-be-measured sub-path is a destination network element on the reference sub-path, a destination network element on the to-be-measured sub-path is a source network element on the reference sub-path, the third packet is transmitted at a third priority over the to-be-measured sub-path of the third loopback path and is transmitted at the first priority over another sub-path of the third loopback path, and the third priority is lower than the first priority; and determining, by the measurement apparatus, a second one-way delay generated when a packet is transmitted at the third priority over the to-be-measured sub-path as $(2 \times T2-T1-T0)/2$.

9. The method according to claim 8, wherein determining the delay T2 comprises:

sending, by the measurement apparatus, the third packet, wherein the third packet comprises routing information of the third loopback path, wherein the routing information in the third packet is configured to instruct a network element on the third loopback path to route the third packet along the third loopback path, wherein the third packet further comprises priority information to instruct the network element on the third loopback path to: transmit the third packet at the third priority over the to-be-measured sub-path and transmit the third packet at the first priority over the another sub-path; and receiving, by the measurement apparatus, the third packet returned over the third loopback path, wherein the delay T2 is determined as a difference between when the third packet was received and when the third packet was sent.

10. The method according to claim 1, wherein the second priority is lower than the first priority.

11. A measurement apparatus comprising:

a processor; and a non-transitory computer readable medium which contains computer-executable instructions, the processor is configured to execute the computer-executable instructions to perform operations comprising:

determining a delay T0 for transmitting a first packet at a first priority over a first loopback path, wherein the first loopback path consists of a first sub-path from the measurement apparatus to a first network element in a communications network and a second sub-path from the first network element to the measurement apparatus, and the first priority is not a lowest priority for transmission in the communications network;

determining a delay T1 for transmitting a second packet over a second loopback path, wherein the second loopback path consists of the first sub-path, a third sub-path from the first network element to a second network element in the communications network, a fourth sub-path from the second network element to the first network element, and the second sub-path, wherein the second packet is transmitted at the first priority over the first sub-path and the second sub-path, the second packet is transmitted at a second priority over the third sub-path and the fourth sub-path, and the second priority is not higher than the first priority; and determining according to T0 and T1, a delay between the first network element and the second network element;

wherein the operation of determining the delay T1 comprises:

sending, by the measurement apparatus, the second packet, wherein the second packet comprises routing information of the second loopback path, wherein the routing information in the second packet is configured to instruct a network element on the second loopback path to route the second packet along the second loopback path, wherein the second packet further comprises priority information, the priority information indicating the first sub-path and the second sub-path correspond to the first priority such that the second packet is transmitted at the first priority over the first sub-path and the second sub-path, and the third sub-path and the fourth sub-path correspond to the second priority such that the second packet is transmitted at the second priority over the third sub-path and the fourth sub-path; and receiving the second packet returned over the second loopback path, wherein the delay T1 is determined based on a time difference between when the second packet was received and when the second packet was sent.

12. The measurement apparatus according to claim 11, wherein the first priority is a highest priority for transmission in the communications network.

13. The measurement apparatus according to claim 11, wherein determining the delay between the first network element and the second network element comprises: determining a two-way delay between the first network element and the second network element as a difference between T1 and T0.

14. The measurement apparatus according to claim 13, wherein the second priority is equal to the first priority.

15. The measurement apparatus according to claim 14, wherein network elements of the third sub-path and network elements of the fourth sub-path are the same; and a first one-way delay between the first network element and the second network element corresponds to a half of the two-way delay.

16. The measurement apparatus according to claim 11, wherein determining the delay T0 comprises:

sending the first packet, wherein the first packet comprises routing information of the first loopback path, the routing information in the first packet is used to instruct a network element on the first loopback path to route the first packet along the first loopback path, the first packet further comprises priority information, and the priority information in the first packet is used to instruct the network element on the first loopback path to transmit the first packet at the first priority over the first loopback path; and receiving the first packet returned over the first loopback path, wherein the delay T0 is determined based on a time difference between when the first packet was received and when the first packet was sent.

17. The measurement apparatus according to claim 11, wherein the second priority is equal to the first priority, wherein network elements of the third sub-path and network elements of the fourth sub-path are the same, and wherein the operation of determining the delay between the first network element and the second network element comprises:

determining a delay T2 generated when a third packet is transmitted over a third loopback path, wherein the third loopback path consists of the first sub-path, the second sub-path, a to-be-measured sub-path, and a reference sub-path, the reference sub-path is the third sub-path or the fourth sub-path, a source network element on the to-be-measured sub-path is a destination network element on the reference sub-path, a destination network element on the to-be-measured sub-path is a source network element on the reference sub-path, the third packet is transmitted at a third priority over the to-be-measured sub-path of the third loopback path and is transmitted at the first priority over another sub-path of the third loopback path, and the third priority is lower than the first priority; and determining a second one-way delay generated when a packet is transmitted at the third priority over the to-be-measured sub-path as $(2 \times T2 - T1 - T0)/2$.

18. The measurement apparatus according to claim 17, wherein the operation of determining the delay T2 comprises:

sending the third packet, wherein the third packet comprises routing information of the third loopback path, the routing information in the third packet is used to instruct a network element on the third loopback path to route the third packet along the third loopback path, wherein the third packet further comprises priority information to instruct the network element on the third loopback path to: transmit the third packet at the third priority over the to-be-measured sub-path and transmit the third packet at the first priority over the another sub-path; and receiving the third packet returned over the third loopback path, wherein the delay T2 is determined as a difference between when the third packet was received and when the third packet was sent.

19. The measurement apparatus according to claim 11, wherein the second priority is lower than the first priority.

20. A non-transitory computer readable medium containing computer-executable instructions, the computer-executable instructions, when executed by a processor of a measurement apparatus, causing the measurement apparatus to perform operations comprising:

determining a delay T0 of transmitting a first packet at a first priority over a first loopback path, wherein the first loopback path consists of a first sub-path from the measurement apparatus to a first network element in a communications network and a second sub-path from the first network element to the measurement apparatus, and the first priority is not a lowest priority for transmission in the communications network;

determining a delay T1 for transmitting a second packet over a second loopback path, wherein the second loopback path consists of the first sub-path, a third sub-path from the first network element to a second network element in the communications network, a fourth sub-path from the second network element to the first network element, and the second sub-path, wherein the second packet is transmitted at the first priority over the first sub-path and the second sub-path, the second packet is transmitted at a second priority over the third sub-path and the fourth sub-path, and wherein the second priority is not higher than the first priority; and determining according to T0 and T1, a delay between the first network element and the second network element;

wherein the operation of determining the delay T1 comprises:

sending, by the measurement apparatus, the second packet, wherein the second packet comprises routing information of the second loopback path, wherein the routing information in the second packet is configured to instruct a network element on the second loopback path to route the second packet along the second loopback path, wherein the second packet further comprises priority information, the priority information indicating the first sub-path and the second sub-path correspond to the first priority such that the second packet is transmitted at the first priority over the first sub-path and the second sub-path, and the third sub-path and the fourth sub-path correspond to the second priority such that the second packet is transmitted at the second priority over the third sub-path and the fourth sub-path; and receiving the second packet returned over the second loopback path, wherein the delay T1 is determined based on a time difference between when the second packet was received and when the second packet was sent.

* * * * *